United States Patent
Ormont et al.

(10) Patent No.: US 11,836,589 B1
(45) Date of Patent: Dec. 5, 2023

(54) PERFORMANCE METRICS OF RUN-TIME PREDICTIONS OF AUTOMATED MACHINE LEARNING (AUTOML) MODELS RUN ON ACTUAL HARDWARE PROCESSORS

(71) Applicant: Eta Compute, Inc., Sunnyvale, CA (US)

(72) Inventors: Justin Ormont, Kirkland, WA (US); Evan Petridis, Palo Alto, CA (US); Luan Nguyen, San Jose, CA (US); Jeremi Wojcicki, Milan (IT)

(73) Assignee: Eta Compute, Inc., Sunnyvale, CA (US)

( * ) Notice: Subject to any disclaimer, the term of this patent is extended or adjusted under 35 U.S.C. 154(b) by 0 days.

(21) Appl. No.: 18/350,675

(22) Filed: Jul. 11, 2023

Related U.S. Application Data

(60) Provisional application No. 63/484,764, filed on Feb. 14, 2023, provisional application No. 63/388,084, filed on Jul. 11, 2022.

(51) Int. Cl.
*G06N 20/00* (2019.01)
(52) U.S. Cl.
CPC ................... *G06N 20/00* (2019.01)
(58) Field of Classification Search
None
See application file for complete search history.

(56) References Cited

U.S. PATENT DOCUMENTS

2021/0241127 A1* 8/2021 Rosenberg ............. G06N 3/006

OTHER PUBLICATIONS

Wang, et al., Enabling Harmonious Human-Machine Interaction with Visual-Context Augmented Dialogue System: A Review, ACM Comput. Surv., vol. 1, No. 1, Article 1. Publication date: Jan. 2019, pp. 1:1-1:33 (Year: 2019).*
Wang, et al., Proteus: Network-aware Web Browsing on Heterogeneous Mobile Systems, CoNEXT '18, 2018, pp. 379-392 (Year: 2018).*
Xu, et al., A Survey on Multi-output Learning, arXiv:1901.00248v2 [cs.LG] Oct. 13, 2019, pp. 1-21 (Year: 2019).*

(Continued)

*Primary Examiner* — Wilbert L Starks
(74) *Attorney, Agent, or Firm* — SoCal IP Law Group LLP; Angelo J. Gaz; Steven C. Sereboff

(57) ABSTRACT

Systems and methods for optimizing trained ML hardware models by collecting machine learning (ML) training inputs and outputs; selecting a ML model architecture from ML model architectures; training the selected ML model architecture with the ML training inputs and outputs; selecting a hardware processor from hardware processors; and creating a trained ML hardware model by inputting the selected hardware processor with the trained ML model. ML test inputs and outputs, and types of test metrics are selected and used to test the trained ML hardware model to provide runtime test metrics data for ML output predictions made by the trained ML hardware model. The trained ML hardware model is optimized to become an optimized trained ML hardware model using the runtime test metrics by selecting a new selected ML model architecture, selecting a new selected hardware processor, or updating the trained ML model using the runtime metrics test data.

22 Claims, 5 Drawing Sheets

200 System

(56) References Cited

OTHER PUBLICATIONS

Tonge, et al., Image Privacy Prediction Using Deep Neural Networks, ACM Transactions on the Web, vol. 14, No. 2, Article 7, 2020 , pp. 7:1-7:32 (Year: 2020).*

Albrecht, et al., Autonomous agents modelling other agents: A comprehensive survey and open problems, Artificial Intelligence, vol. 258, 2018, pp. 66-95 (Year: 2018).*

* cited by examiner

100 System

200 System

400 Process flow

500 Computing device

PERFORMANCE METRICS OF RUN-TIME PREDICTIONS OF AUTOMATED MACHINE LEARNING (AUTOML) MODELS RUN ON ACTUAL HARDWARE PROCESSORS

RELATED APPLICATION INFORMATION

This patent claims priority from U.S. Provisional Patent Application No. 63/484,764, titled, ACCURATE RUN-TIME PREDICTION OF AUTO ML, filed Feb. 14, 2023. This patent also claims priority from U.S. Provisional Patent Application No. 63/388,084, titled, AUTOMATIC EXPLORATION OF PROCESSORS, filed Jul. 11, 2022.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

Systems for simultaneously and automatically calculating and comparing real runtime performance metrics for predictions made by multiple trained automated machine learning (AutoML) models run on multiple actual processor hardware chips.

Description of the Related Art

Artificial Intelligence (AI) offers huge benefits for embedded systems. But implementing AI well requires making smart technology choices, especially when it comes to selecting a trained machine learning (ML) model and an actual hardware processor chip to run the model on.

How do you correctly select the best model and chip combination so that you end up with an optimized trained ML hardware model? The answer lies in ML hardware models being developed that will power AI in the future. Similar to an engine in an automobile, the ML hardware model determines how well, how fast and how efficient the vehicle will run.

AI, machine learning (ML) and deep learning are all terms that can be used for neural networks which are designed to classify objects into categories after a training phase. ML hardware models require powerful chips for computing answers, which is called inferencing, from large data sets, which is the training part. Inference is the part of machine learning when the neural net uses what it has learned during the training phase to deliver answers to new problems. This is particularly important in edge applications, which may be defined as anything outside of the data center. A neural network may be one specific type of a ML model.

The edge ML hardware model market is expected to be one of the biggest over the next five years. Typical applications may include smart surveillance cameras and real-time object recognition, autonomous driving cars and other Internet of things (IoT) devices. In the past, most ML hardware models were developed for the data center. However, the movement of AI to the edge of the network requires a new generation of specialized ML hardware model processors that are scalable, cost effective and consume extremely low power.

What is needed is the ability to quickly, cheaply and accurately optimize a trained ML hardware model to become an optimized trained ML hardware model such as for an embedded chip of a customer's physical device.

Throughout this description, elements appearing in figures are assigned three-digit or four-digit reference designators, where the two least significant digits are specific to the element and the one or two most significant digit is the figure number where the element is first introduced. An element that is not described in conjunction with a figure may be presumed to have the same characteristics and function as a previously-described element having the same reference designator or the same two least significant digits.

DETAILED DESCRIPTION

Technologies described herein provide systems and methods for optimizing a trained machine learning (ML) hardware model to become an optimized trained ML hardware model. The systems and methods may simultaneously and automatically calculate and compare real runtime performance metrics for predictions made by multiple trained automatic machine learning (AutoML) models run on multiple actual processor hardware chips. Real runtime performance metrics that can be selected for testing the trained ML hardware model include power, performance, accuracy, optimization objectives, model and performance constraints.

The systems and methods run trained automated ML models on actual production hardware chips to get real runtime metrics data, thus obtaining accurate runtime calculations for the models and chips that can be compared to select an optimized ML hardware model. Besides accuracy, this technique eliminates the need to characterize or model the hardware chip. The system provides a way of getting the real, accurate runtime metrics data, such as runtime power, performance and accuracy measurements from testing the ML hardware models. For example, the automated ML models may be integrated directly into a low-power environment, such as into processors of an embedded chip of a solar-powered camera. During optimization, a number of automated ML models may be run on a number of processor chips while runtime metrics are measured and compared.

Description of Apparatus

Figure 1:
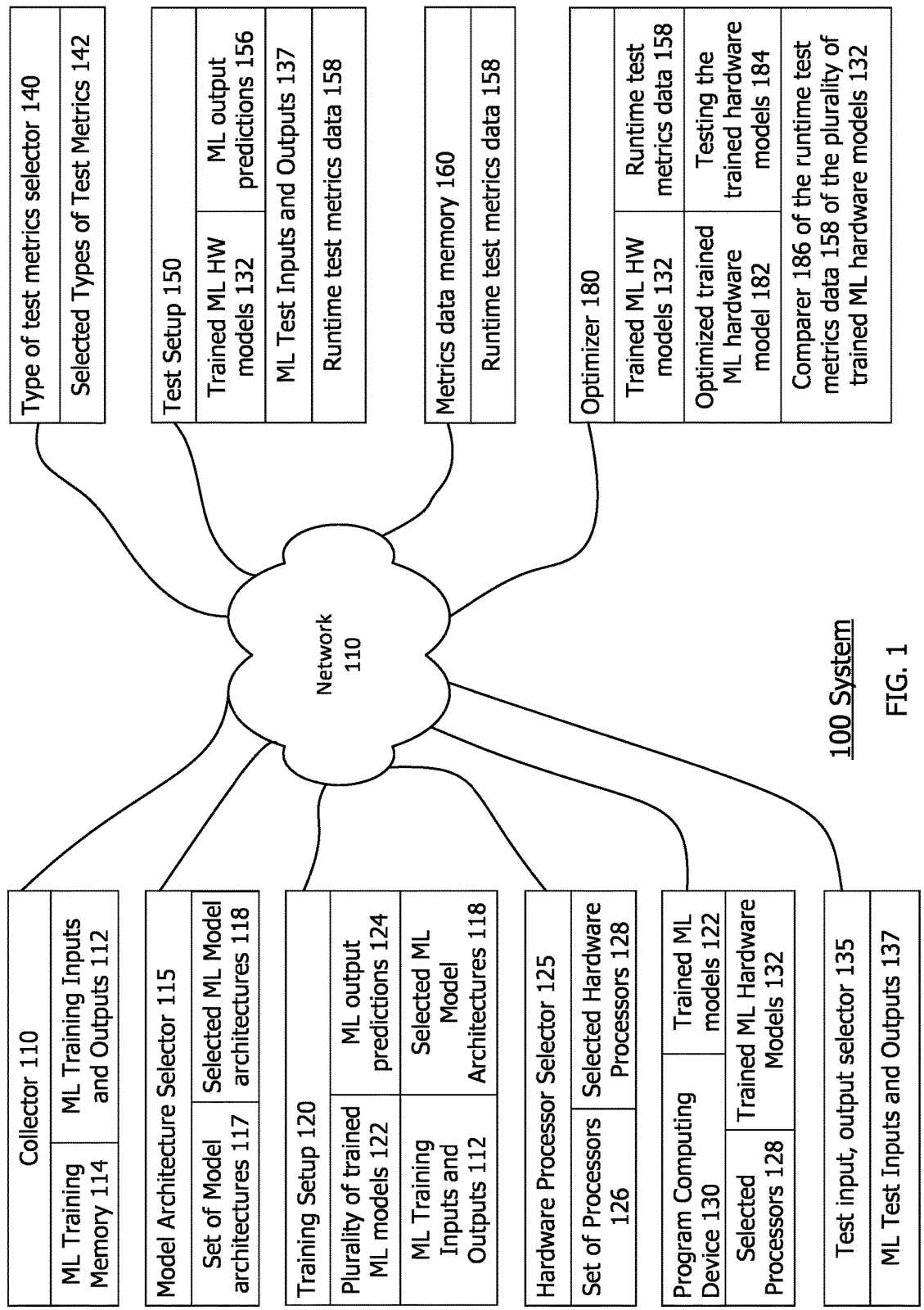
FIG. 1 is a block diagram of a system for optimizing a trained ML hardware model to become an optimized trained ML hardware model.

Referring now to FIG. 1, there is shown a block diagram of a system 100 for optimizing trained ML hardware models 122 to become an optimized trained ML hardware model 182 using runtime test metrics data 158 from testing of the trained ML hardware models 184/122 of selected hardware processors 128. Descriptions herein of being "for" an action may mean that units, components or systems are configured to and/or adapted to perform that action, such as as part of optimizing trained ML hardware models to become an optimized trained ML hardware model.

The system 100 includes collector 110, selector 115, setup 120, selector 125, device 130, selector 135, selector 140, setup 150, memory 160 and optimizer 180, each of which may be described as or as including at least one unit, module, engine or computing device. These units of system 100 are all interconnected by a network 110, such as a data connection like the Internet. These units of system 100 may each be located on at least one separate computing device. Any combination or combinations of the units may be on the same computing device. In some cases, all of the units are on one computing device. A computing device may be or include a client, a server, or another type of computing device. A unit may include a memory and a processor executing computer instructions stored in the memory to perform the actions of the unit. A unit may be assisted by a human user using an input/output device such as a keyboard and a display.

The actions of each of the units of system 100 may be performed automatically and/or manually. Automatically or automated may describe when or a system (or unit) in which an action occurs without user input to cause, guide or select that actions course, end, selection, optimization or comparison. Occurring manually may describe when a system (or unit) in which an action occurs with or only by user input to cause, guide or select that action's beginning, course, end, selection, optimization or comparison. Occurring manually, may be when an action is assisted by or performed only by a human user, such as of system 100.

Collector 110 is a collector for collecting machine learning (ML) training inputs and ML training outputs for training a ML model. The training inputs may be (analog or digital) images, pictures, frames, video, audio, data, or other media. Collecting may or may not include actually creating the ML inputs and outputs. Collector 110 may be or include one or more computing devices, software executing on processors, neural networks, training beds, training systems, training architectures and/or training simulators.

The collector 110 may automatically or manually create the ML training inputs and ML training outputs 112 using a simulator, such as a camera and ML model and processor (e.g., IC chip) used with a display of known inputs having known outputs. The collector 110 may obtain the ML training inputs and outputs 112 (manually or automatically) from system 100 or another source of data. The collector may obtain the ML training inputs and ML training outputs 112 from another party such as a customer who purchases the optimized trained ML model 182 or desires the custom model at 295. The customer may provide the inputs and outputs 112 to the user and hire the user to produce the model 182 for a fee.

The collector 110 may include an ML training input-to-output selector (not shown) for automatically creating metadata for the ML training inputs and the ML training outputs 112, and automatically creating labels for the ML training inputs and the ML training outputs 112. In other cases, the metadata and/or labels are manually created. The collector 110 may include an ML training memory 114 for storing the ML training inputs, the ML training outputs, the metadata and the labels in a ML model database.

Selector 115 is an ML model architecture selector for selecting a plurality (e.g., greater than 1 but less than 100,000) of selected ML model architectures 118 from a set of ML model architectures 117. The set of ML model architectures 117 may be one or more types of ML model architectures. Selector 115 may be or include one or more computing devices and/or software executing on processors.

Setup 120 is a training setup for training a plurality of trained ML models 122 by training the selected ML model architectures 118 with the ML training inputs and the ML training outputs 112 to make ML output predictions 124 based on ML inputs. Setup 120 may be or include one or more computing devices, software executing on processors, neural networks, training beds, training systems, training architectures and/or simulators such as described for collector 110.

Selector 125 is a hardware processor selector for selecting a plurality of selected hardware processors 128 from a set of hardware processors 126. Each processor may be part of and optionally described as a PCB, hardware board or chip which includes the processor. Selector 125 may be or include one or more computing devices and/or software executing on processors.

A hardware processor of processors 126 and 128 may be or include a computer processor, an integrated circuit (IC) chip, BIOS, electronic circuitry or other fabricated semiconductor hardware capable of being programed with, retaining and executing one or more of the trained ML models 122. It may be an IC, also called microelectronic circuit, microchip, or chip, having an assembly of electronic components, fabricated as a single unit, in which miniaturized active devices (e.g., transistors and diodes) and passive devices (e.g., capacitors and resistors) and their interconnections are built up on a thin substrate of semiconductor material (typically silicon).

In some cases, each of processors 126 and 128 includes electronic circuitry, such as including PCB, transistors, resistors, capacitors, inductors, traces, ICs, chips, ROM and/or other hardware circuitry that is programed with, retaining and executing one or more of the trained ML models 122. In some cases, each is computer logic, computer chips, a computer chip, computer circuitry and/or computer hardware. In some cases, each is a computer processor or hardware logic programmed with software.

Device 130 is a programmed computing device for programming the plurality of selected hardware processors 128 to create a plurality of trained ML hardware models 132 by inputting the plurality of selected hardware processors 128 with the plurality of trained ML models 122. The plurality of models 132 may be a matrix or an array of the plurality of processors 128=P multiplied by the plurality of models 122=M to form a P×M matrix. Device 130 may make each of the model 132 as or on the particular chip 128. Device 130 may be or include one or more hardware programming computing devices, software executing on processors, programming beds, programming architectures and/or simulators such as described for collector 110. In some cases, there is only one of processors 128 such as where the same processor will be programmed with a number of models 122 to create models 132 which are optimized. In other cases, there are multiple processors 128. It is possible that optimizing starts with one processor 128 and after testing, another processor 128 is selected.

Selector 135 is a ML test input and output selector for selecting ML test inputs and ML test outputs 137 for testing the plurality of trained ML hardware models 132. Selector

135 may be or include one or more computing devices and/or software executing on processors.

Selector 140 is a type of test metrics selector for selecting types of test metrics 142 for testing the trained ML hardware model. The types of test metrics 142 may include measurement, power, performance, accuracy, etc. metrics; optimization objectives; model constraints; and/or performance constraints measured when testing the trained ML hardware models 132.

The types of test metrics 142 may include Multi-objective optimization of any two or more of the types of test metrics 142. The types of test metrics 142 may include Multi-objective optimization of power, speed and accuracy of the trained ML hardware models 132 (e.g., using data 182). Selector 140 may be or include one or more computing devices and/or software executing on processors.

Setup 150 is a testing setup for testing the plurality of trained ML hardware models 132 using the ML test inputs and ML test outputs 137 to produce or provide runtime test metrics data 158 for the selected types of test metrics 142. Data 158 may be measured for, from or on the models 132 when they are input with the test inputs 137 and have their output predictions 156 compared to the test outputs 137 during their testing. Data 158 may predict speed and accuracy of the models 132, such as per a prediction of ML outputs 156 made by the trained ML hardware models 132 given the ML test inputs.

Setup 150 may include hardware connections such as wired or wireless data connections between a computing device and the models 132. Setup 150 may test the models 132 by hooking each model to a test rig, which is the physical testing of how well does the model work. The test rig could be or include a simulator, a camera, and/or a computer monitor that displays images or video, such as of people walking in and out of view. This allows easy comparisons of models 132 by the optimizer.

Using the test rig is a more holistic test because it includes the full device, e.g., model 132 with the camera, not just the model 1320. Thus, the accuracy, speed and power of a model 132, including the camera and the communication subsystem (e.g., the Bluetooth stack or the Wi-Fi stack) can be can measured during the testing. This gives full and accurate testing of power consumption and length of the battery life. Setup 150 may be or include one or more computing devices, software executing on processors, neural networks, test beds, test systems, test architectures and/or simulators such as described for collector 110.

Memory 160 is a metrics data memory or for collecting and/or storing the runtime test metrics data 158 from the testing at setup 150. Memory 160 may be or include one or more computing devices and/or software executing on processors.

Optimizer 180 is an optimizer for optimizing the plurality of trained ML hardware models 132 to become an optimized trained ML hardware model 182 using the runtime test metrics data 158 by simultaneously and automatically performing the testing of the trained ML hardware models 184 at setup 150 and by comparer 186 performing comparing of the runtime test metrics data 158 of the plurality of trained ML hardware models 132 during testing 184 at setup 150.

Comparer 186 comparing may include comparing against each other the data 158 of each of models 132 to select one or more of data 158 for one or more of models 132 that is better or more desirable than the other of data 158 of models 132. Comparing at 186 may include selecting one of data 158 for one of models 132 that is better or more desirable than the other of data 158 of models 132.

Optimizer 180 and/or the comparing at 186 may include a human user using one or more input devices, output devices and/or displays of a computing device to optimize the plurality of trained ML hardware models 132 to select an optimized trained ML hardware model 182 using the runtime test metrics data 158 by simultaneously and automatically performing the testing at setup 150 and performing comparing at 186 of the runtime test metrics data 158 of the plurality of trained ML hardware models 132. In some cases, the human user may be assisted by a computer ML of optimizer 180 and/or comparer 186. Optimizer 180 may include a computing device display for simultaneously and automatically displaying the runtime test metrics data 158 of the plurality of trained ML hardware models 132.

Optimizer 180 may include one or more of: a new model selector for selecting a new selected ML model architecture of architectures 117 that is part of the optimized trained ML hardware model 182 to be the optimized trained ML hardware model 182; a new processor selector for selecting a new selected hardware processor of processors 126 that is part of the optimized trained ML hardware model to be the optimized trained ML hardware model 182; and/or a model updater for updating the trained ML hardware model 132 (or models 122) using the runtime metrics test data 158 to be the optimized trained ML hardware model 182.

Optimizer 180 may include a re-tester and re-optimizer for re-testing and re-optimizing the optimized trained ML hardware model 182 to select a new optimized trained ML hardware model. Here, the optimized trained ML hardware model 182 may be a plurality of optimized trained ML hardware models. In this case, the testing setup 150 may produce (or provide) new runtime test metrics data 158 for the selected types of metrics 142 for or based on the ML output predictions 156 made by the plurality of optimized trained ML hardware models 182 using or given the ML test inputs and outputs 137. Here, the optimizer 180 may optimize the plurality of optimized trained ML hardware models 182 using the new runtime test metrics data 158 by simultaneously and automatically performing the testing of the plurality of optimized trained ML hardware models 182 and by comparer 186 performing comparing of the new runtime test metrics data of the plurality of optimized trained ML hardware models 182.

Optimizer 180 may be or include one or more computing devices, software executing on processors, neural networks, test data analyzers, metrics data analyzers, test analysis architectures and/or metrics data comparers.

System 100 may also include a validator for creating a validated version of the optimized ML hardware model 182 by writing firmware to one of the selected hardware processors 128. The validator may be or include one or more computing devices, software executing on processors, neural networks, test data analyzers, metrics data analyzers, test analysis architectures and/or metrics data comparers.

Network 110 is a computer network or data connection such as including (analog and/or digital) wired, wireless, cell and other data communications. The interconnections between units of system 180 may be or include wired, wireless, message, packet, Internet, Intranet, LAN and other known data connections between computing device or other electronic devices.

Figure 2:
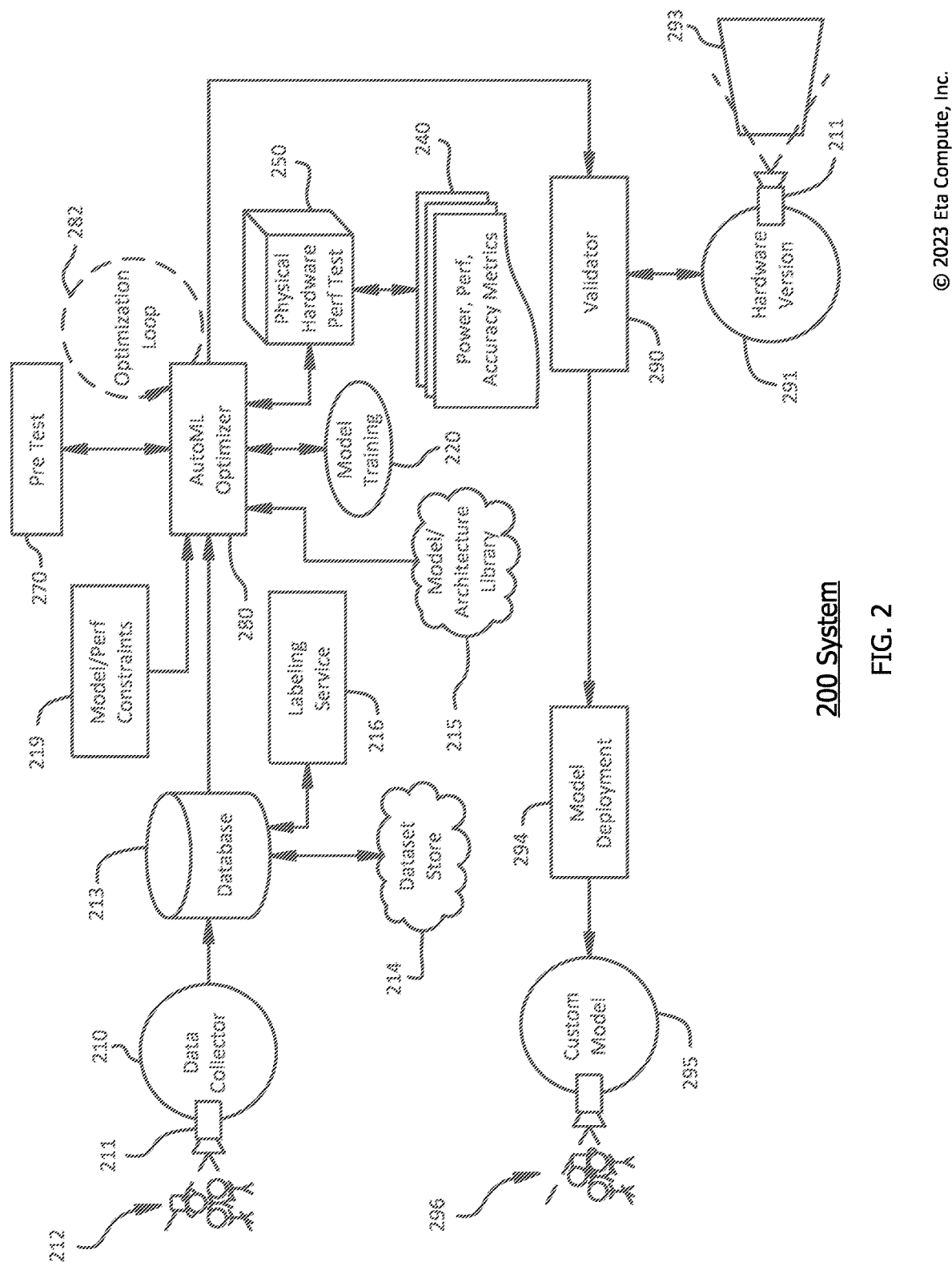
FIG. 2 is a block diagram of a system for optimizing a trained ML hardware model to become an optimized trained ML hardware model.

FIG. 2 is a block diagram of a system 200 for creating and optimizing a trained ML hardware model 132 to become an optimized trained ML hardware model 182. System 200 may create models 132 from scratch, not just optimizes existing ones 182. Each of the parts of system 200 may be described as or as including at least one unit, module, engine or computing device. These units of system 200 are all interconnected data connections such as by network 110. These units of system 200 may each be located on separate or the same computing device as noted for system 100. System 200 may include one or more units of system 100. System 100 and/or 200 may be a suite of different machines hosted in a cloud computing platform except for some physical nodes that are at other servers and/or clients distributed at different locations. For example, test 250 may test models 122 on physical boards or processors 128 at one or more different locations. A goal of the system 100 and/or 200 may be to create a model 182 that can distinguish dogs from fruit in images. The actions of each of the units of system 200 may be performed automatically and/or manually.

The data collector 210 of system 200 may be collector 110 that automatically or manually creates the ML training inputs and ML training outputs 112 using a simulator, such as a camera 211 imaging a scene 212 of still or video frames. The data collector 210 may scrape ML training inputs and/or outputs 112 off of a server, the Internet or another network. Inputs and outputs 112 may be or use known image inputs having known outputs. Inputs and outputs 112 may be collected by a customer that is a third party to the system, by a user of the system or automatically by the system. The inputs may be images having dogs or fruit and the outputs may label whether the image has a dog or fruit. In some cases, data 112 is only the inputs and the outputs are created later by a labeling service 216. Although images are discussed as actual inputs, any kind of digital data can be an input, such as audio recordings, time series data and multi-modal data.

From collector 210, the ML training inputs and ML training outputs 112 are sent to and received by the database 213. The database may be or be accessed by an SQL server, an SQL database and/or an Amazon simple storage service (S3). Database 213 may be accessible by users accessing cluster controllers that pick up work tasks from SQL database 213 and send them to a cluster. Sending may spin up machines in a cloud services such as Microsoft Azure to form a cluster of nodes for the training process at setup 120. Database 213 includes and stores datasets which include inputs and outputs 112.

Database 213 sends datasets to and receives datasets from dataset store 214 which stores the datasets. Store 214 may be part of or use S3 to store computer data files. The datasets may include metadata about the data set, such as describing where the dataset is stored, a file location for the dataset, and what the dataset is and/or is for. The datasets may include labeling, such as for the inputs and/or outputs 112.

From database 213 the datasets are sent to and received by the labeling service 216 which may label (or annotate) the training inputs and/or outputs 112 manually and/or automatically. A label may describe an output of what's in an input image. Service 216 has a label data set, such as describing each (training ML input) image as having an (ML output of) apple, a banana, a cat and/or a dog. The labels from service 216 are stored in store 214.

In the case of object detection, service 216 may draw a square box around every single detected desired object (e.g., a person) in the input images. Service 216 can also perform labeling in the case where inputs and outputs 112 are audio data such as from a video camera, microphone, other audio media generator or audio storage. Service 216 can also label for inputs and outputs 112 that are vibrational analysis, gas detection or wire/conduction detection.

Service 216 can also label an analysis that was run on the inputs 112, such as what percent of the input images are grayscale versus color; or how large is every image; and/or what percent of the images have people and how many people on average are and the images. Database 213 sends the datasets including the labels and training inputs and/or outputs 112 to automatic (auto) ML tester and optimizer 280. In some cases, the analysis can reveal incorrect labels which can be automatically corrected by service 216 or by a user controlling service 216.

Model and performance constraints 219 provides performance constraints of the models such as model 118, 122 and/or 132. The constraints at 219 may be a user's or customer's performance constraints such as how fast and accurate to run the testing or predictions. Constraints at 219 may be different clock rates for a specific processor 128 or what processors 128 to program with models 122. Constraints at 219 may be to run a model on selected hardware boards having processor 128 at a certain prediction speed. The boards may have a Synaptics™ chip, an NXP™ chip, an ST™ chip or another brand of microprocessor. Constraints at 219 may include what dataset from database 213 to use with the constraints, model 118, 122 and/or 132.

Constraints 219 may include whether to use either color or monochrome as input. If monochrome is chosen, test 250 can spend more of the time testing different layers of models 132 besides the input layer, because input layer tends to be kind of big and slow. And if the color, saturation or hue do not actually help optimize at loop 282 then monochrome is a better solution because you can use that difference in time to optimize for other purposes as the color was extraneous. Constraints 219 sends the constraints to automatic ML tester and optimizer 280.

Model/architecture library 215 includes a set of types or styles of neural network architectures 117 from which to choose architectures 118. One model architecture may have a structure akin to a straight through model. There are other architectures, such as pre-designed types of architectures, may have a tree-like structure. Library 215 can also modify the types of model architectures by adding and removing components; growing and shrinking components; and duplicating layers of the model architectures to select architectures 118. Library 215 may use neural architecture search (NAS) to select architectures 118. Library 215 sends architectures 118 to automatic ML tester and optimizer 280.

Model training 220 uses the dataset from data store 214 with labeling from service 216 to train selected architecture 118 from library 215 using constraints 219. Training 200 may be training the selected architectures 118 that a user wants trained. Training 200 may send the architectures 118 to a specific machine or set of machines to train, that train the architectures and create trained models 122 from them, such as by building a neural network. Training 220 may train the models 122 to predict a difference between images, such as those having dogs or fruit.

Model training 220 may send the dataset from dataset store 214 and constraints 219 to a cluster to train selected architecture 118, create trained model 122 and evaluate what the accuracy of model 122 is, such as where accuracy is the English version of accuracy, not the machine learning version of accuracy.

One of architectures 117 or 118 may be like the skeleton of an ML model without the weights filled in and which can be trained to make a model 122. One can be a generic architecture, like mobile Net, V2 and the like that is trained with a specific dataset from database 213 and specific hyper parameters 219 to make a specific trained model 122. For example, training images can train architectures 118 with the desired input and output results to get models 122 which are used to try and figure out which silicon processors 128 they works best on. Model training 220 may send dataset, label, architecture, constraints and other data to and receive that data from automatic ML tester and optimizer 280.

Power, performance and accuracy metrics 240 is a set of types of performance test metrics from which selected metrics 142 may be selected and for which runtime test metrics data 158 may be produced. Metrics 240 may be a number of possible, machine learning metrics such as how much power does a model 132 take to perform one or a number of predictions 156? How fast does that model 132 run? Does that model 132 run accurately on the physical board having processor 128? Does that model 132 run correctly on the physical board? Metrics 240 may send selected metrics 142 and metrics data 158 to and receive that data from physical hardware performance test 250.

The physical hardware performance test 250 tests the models 132 from training 220 by programming processors 128 with models 122, and then using the ML test inputs and ML test outputs 137 to test models 132 and produce runtime test metrics data 158 for the selected types of test metrics at 240. Test 250 may include descriptions for setup 150. Test 250 may use a testing rig to test models 132 with the test inputs and outputs to produce data 158. Test 250 may test whether models 132 successfully predict a difference between images having dogs or fruit.

The test rig may have known outputs 137 and run the same inputs (e.g., videos) as known inputs 137 past each model 132 being tested. For example, the models 132 either count a person that walked through in the video or do not. Setup 150 knows what kind of person walked through in the video and data 158 shows the model 132 made the right decision at prediction 156. The video might show three people wearing light clothing walking onto a bus. Data 158 shows whether the people in light clothing counted or not. Physical hardware performance test 250 may send selected metrics 142, models 132 and metrics data 158 to and receive models 122, ML test inputs and ML test outputs 137 and constraints 219 from ML tester and optimizer 280.

Processor pre-test 270 is for exploring the capabilities of processor 128 and storing those capabilities so they can be accessed later by optimizer 280 and loop 282 when optimizing models 132 to become model 182. Processor pre-test 270 can perform pre-testing of a boards 128 to figure out what metrics it is good at and also the memorization of the metrics determined in the past that will accelerate the automl optimization process.

Pre-test 270 may use a virtual board to simulate a physical board having processor 128 to accelerate the process of testing on a real board at test 250 which can be slower. Pre-test 270 may model some parts of the processors 128 to more quickly determine if processor programmed with models 122 will meet user targets such as inference time and/or memory usage. If data 158 collected using the virtual board do not meet user constraints 219, this is a negative result. Therefore, training 220 will not train that processor 128 at training 220 or test the processor in model 132 at test 250 based on the negative result.

Pre-test 270 may use requirements that are the user's constraints 219, such as the virtual board has to be at least 20% accurate or 95% accurate to determine negative or positive results. It can pre-determine that optimizer either needs to adjust the models 122 to hit the positive required accuracy or needs to select a different processor that can do that accuracy with the models 122. It can automatically explore virtual versions of models 132 where actual hardware processors 128 are not implemented. It automatically will, for instance, size up and size down the models 122, which affects both the accuracy and the runtime and the power data 158 to steer away from negative results.

Pre-test 270 can store those capabilities and negative and positive results of processors 128 in a silicon library that can be subsequently accessed by optimizer 280 and loop 282 for different ones of models 122 being programmed on prior tested virtual version of processors 128 to more quickly arrive at models 132 and 182.

Pre-test 270 may also use some pre-existing knowledge from the silicon library that is static information about the processors 128 and what models 122 and/or constraints 219 work well on the particular processors 128 based on user input and/or technical specifications.

For processors 128 having negative results at pre-test 270, training 220 might not train, test 250 might not test or optimizer might disregard ones of models 132 having those processors. In some cases, pre-test 270 uses stored information from optimizer 280 noted below, or vice versa.

Pre-testing 270 may determine which types of operations (ops) constituting a model 132 or included in a model 132, are supported by the processor 128 and how efficient that processor is in executing those ops. In one example, if pre-test 270 determines that two operations (e.g., ELU and RELU6 operations) are not supported by the processor 128, optimizer 280 will not (e.g., based on receiving information from pre-test 270 of the non-support) waste time creating and testing models 132 which contain such operations. Instead, optimizer 280 can use a closest alternative for one or both ops (such as RELU). In another example, processors 128 may have a vector processing unit which can significantly accelerate certain model ops. However, these units often have memory limits which when exceeded can cause computational efficiency to drop significantly, such as due to additional memory copying or offloading operation to less efficient memory cores. During pretesting 270, such performances can be revealed and optimizer 280 (based on information from pre-test 270) can exclude and avoid using inefficient configurations.

Auto ML tester and optimizer 280 is an optimizer for optimizing the plurality of trained ML hardware models 132 to become an optimized trained ML hardware model 182 using the runtime test metrics data 158 by simultaneously performing the testing of the trained ML hardware models at test 250 and comparing the runtime test metrics data 158 of the plurality of trained ML hardware models 132 during testing at test 250.

Optimizer 280 may be or perform a process of automating the steps of machine learning (ML) to obtain a goal using loop 282 and the datasets from database 213 using data 158 as a way to measure the goal, it may be a way to measure the success of any individual model 132 and then tell loop 282 to iterate to a different or new model 132. So, models 132 may be dozens, hundreds or thousands of models that optimizer 280 processes to comes up with something good based on data 158.

Optimizer has optimization loop 282 for using data 158 to then make better choices on what to try next for models 122 and/or processors 118 to optimize models 132 to become model 182. Loop 282 may adjust the model 122 a little bit if needed or switch to a different chip 128 of models 132 and go with whatever that chip is most efficient at to optimize to model 182. Loop 282 may update to a next selection of models 122 and/or processors 118 for models 132 to optimize those pieces. Loop may send the updated models 132 to test 250 for testing and then repeat based on the data 158 from testing of the updated models 132. Optimizer 280 and loop 282 may automatically determine or be used by a user to determine a combination of one model of models 122, and one processor of processors 128 that are optimal or preferred based on data 158 to optimize models 132 to become model 182. loop 282 may find a model 132 that maximizes accuracy, minimizes time and/or minimizes the energy, per prediction 156 or at test 250. Optimizer 280 may optimize the models 132 to predict a difference between images having dogs or fruit.

To optimize models 132 to become model 182, optimizing at loop 282 may use a multivariable balancing approach. If only accuracy of prediction is selected, the most accurate model 132 can be selected without trying to minimize the prediction time. Adding in optimizing the time creates a trade-off between how fast and how accurate the model is. Now, optimization loop 282 is going to explore the line of faster models that are less accurate versus slower models that are more accurate and there is a trade-off line that connects those two. Here a user selection can be made regarding the multivariable balance, such as based on customer desires or other factors having to do with a model deployment or custom model. In other cases, an automated and/or user selection can be made.

Optimizing at loop 282 may maximize the accuracy (e.g., the English version) of predictions 156 of models 132 as compared to known test outputs 137, minimize how fast does models 132 predict (the speed) and to minimize how much power is utilize by models 132 to make the predictions. It may minimize the time it takes to do a prediction on a chip and minimize how much power the chip uses and generally maximize the desired maximum metrics.

For example, to select whether it is preferable to have 97% accurate and takes 4.78 milliseconds for a prediction; or to have 90% accurate and takes 1.1 milliseconds. The first may be preferred when safety is involved such as driving a car while the second may be preferred in a rough count situation such as counting fish processed on a fishing ship.

At loop 282, for each of architectures 118 each model 122 can be resized, such as by resizing the width of the layers or the stack of the layers; adding or removing parts of a model 122; and/or adding or removing parts of an architecture 118 to make model 132 work better both for this specific dataset and to work faster for the specific hardware processor 118. So, for running models 122 on a specific chip 118, that specific chip along with it's the SDK (e.g., a Neural Net compiler and/or model runtime engine) that powers it will be good or bad at certain types of metrics 142. For a model 132, if one operation or prediction 156 is significantly faster than the others, loop 282 can spend more time in (e.g., slow down) that type of operation, with all else being equal (e.g., power and accuracy). Loop 282 may gravitate to using that model 132 more often because it is better at that one thing. Loop 282 may go through and figure out what a specific chip 118 is good at and exploit all the things that chip is good at and avoid the things that chip is not good at. The loop 282 also considers constraints of the specific hardware processor 118, like, how much memory it has.

Optimizer 280 and/or loop 282 may design the models 182 and choose what new models 182 to test next, given the results data 158 of how well particular model 132 did on the chips 128 and how well models 132 did in the training process 120. For example, between speed and accuracy of predictions 156, loop 282 may get a 69% accurate model running at 1.3 milliseconds or an 80.6% accuracy at 114 milliseconds. So, the second result is an increase in accuracy, but it is a hundred times slower, which may be unacceptable for model 182. The user or a computing device of optimizer 280 may select an optimal trade-off of the multivariable balancing approach.

Optimizer 280 is able to store in a memory what certain models 132 are good at and what they are bad at based on data 158 to accelerates the optimizing at 280 of future models 132 that use some of processors 128 and/or models 122. This allows using knowledge of things that were optimized at loop 282 in the past for different models 132 for the same or different users or customers. For example, what types of model architectures 118 worked well on particular processor 128 for new datasets that look like the dataset from data 213 used by optimizer on models 132.

Optimizer 280 may be a mathematical apparatus that creates a data driven, probabilistic representation of all prior tested models 132. Each of these prior tested models 132 becomes a training sample, where model 132 configurations (architectural parameters) are treated as inputs and model performance (accuracy, runtime) as outputs to be predicted. Each of these inputs and outputs can subsequently be used as an input and output 112 and/or 137.

Optimizer 280, when proposing a new model 132 or 182, may attempt to create such a model configuration which, according to the internal predictions of optimizer 280 or pre-test 270 will maximize metrics of interest, such as of types of metrics 142 based on data 158. After each model is then trained at 220 and tested at 250, the internal representation of the model is updated by optimizer 280 or loop 282, allowing the optimizer to make better predictions in the future. The optimizer may be bayesian-based or include a Bayesian analysis of data 158.

In some cases, there is only one of processors 128 such as where the same processor will be programmed with a number of models 122 to create models 132. In other cases, there are multiple processors 128. It is possible that optimizing starts with one processor 128 and after testing, another processor 128 is selected.

Optimizer 280 and loop 282 may include descriptions for optimizer 180.

Validator 290 is for creating a validated hardware version 291 of the optimized ML hardware model 182 including by writing or "burning" firmware to one of the selected hardware processors 128. Validator 290 may validate the optimized trained ML hardware model 182 to become a validated ML hardware model version 291 by testing the optimized trained ML hardware model 182 with automated simulator inputs and outputs to produce validation test data.

When optimizer 280 and loop 282 finally optimize to one model 182 of models 132, and the one chip of processor 128 that are optimal based on data 158, validator 290 may be used to pretend to produce that combination in the custom model at 295 by writing firmware of that one model into that one processor to create a fully built hardware version 291. Version 291 may be a fully built hardware of a chip 128 with firmware, or BIOS to set up the neural network of optimized model 182 running with the camera 211, pre-processing code, post-processing code, a Bluetooth controller chip, a chip that takes input from the camera and resizes the input a chip that performs color correction on the image from the camera, host processing code that reads the output from the ML model 182, batteries, charge ports, control buttons, displays and/or other accessory components that are to be on the custom model at 295.

The fully built hardware version 291 may then be automatically or manually tested by using a simulator, such as a camera 211 imaging a scene 293 of still or video frames. Scene 293 may provide the automated simulator inputs for which there are known automated simulator outputs.

Validator 290 may aim camera 211 of version 291 at a computer display or other screen showing scene 293 and measure how well version 291 actually performs based on measuring data 158. With the camera in place and with the version's exact pre-processing and post-processing code. Similar to at data collector 110, the inputs may be images having dogs or fruit and the outputs may label whether the image has a dog or fruit.

Model deployment 294 is for deploying a ML hardware model of model 182 and/or version 291 by testing the model 182 or version 291 with customer simulator inputs and outputs to produce deployment test data. Deployment 294 may be similar to validator 290 except the testing is automated and version 291 is a version that customer desires to be the model 295.

Deployment at 294 may include automated testing validated version 291 by having version 291 watch a screen displaying images with people walking through a scene and deployment 294 measuring as data 158, what percent of people on the screen are correctly detected by version 291.

Custom model 295 is for customizing the deployed ML hardware model of model 182 and/or version 291 by testing a customer product with that model or version with data of, from or collected for the customer environment 296 to produce customer based test data 158. Customizing at 295 may be similar to validator 290 except the testing is with customer setting or provided inputs and outputs, and the model and version are part of the product hardware of customer desired model 295 for the customer's specific use.

Here, the customer environment may be one that the deployed ML hardware model is not very good at predicting, such as in a restaurant having carpet that happens to look a bit like a person, or a table that is approximately human shaped when the model is trying to detect people. Model 295 may collect more data 158 and then feed data that through optimizer 180 to customize to a custom model 295 specific for the customer's use case.

After validation 290, deployment 294 or model 295, version 291 or optimized model 182 may be returned to optimizer 280 for further optimizing to create a new model 182 by further training model 182 by adding the automated or customer simulator inputs and outputs to prior training data or retraining model 182 from scratch with only the automated or customer simulator inputs and outputs. Creating a new model 182 may include collecting at database 213 and labeling at service 216 the automated or customer simulator inputs and outputs to make a new model 182 that is good at doing just that one thing of automated or customer simulator inputs and outputs.

Description of Processes

Figure 3:
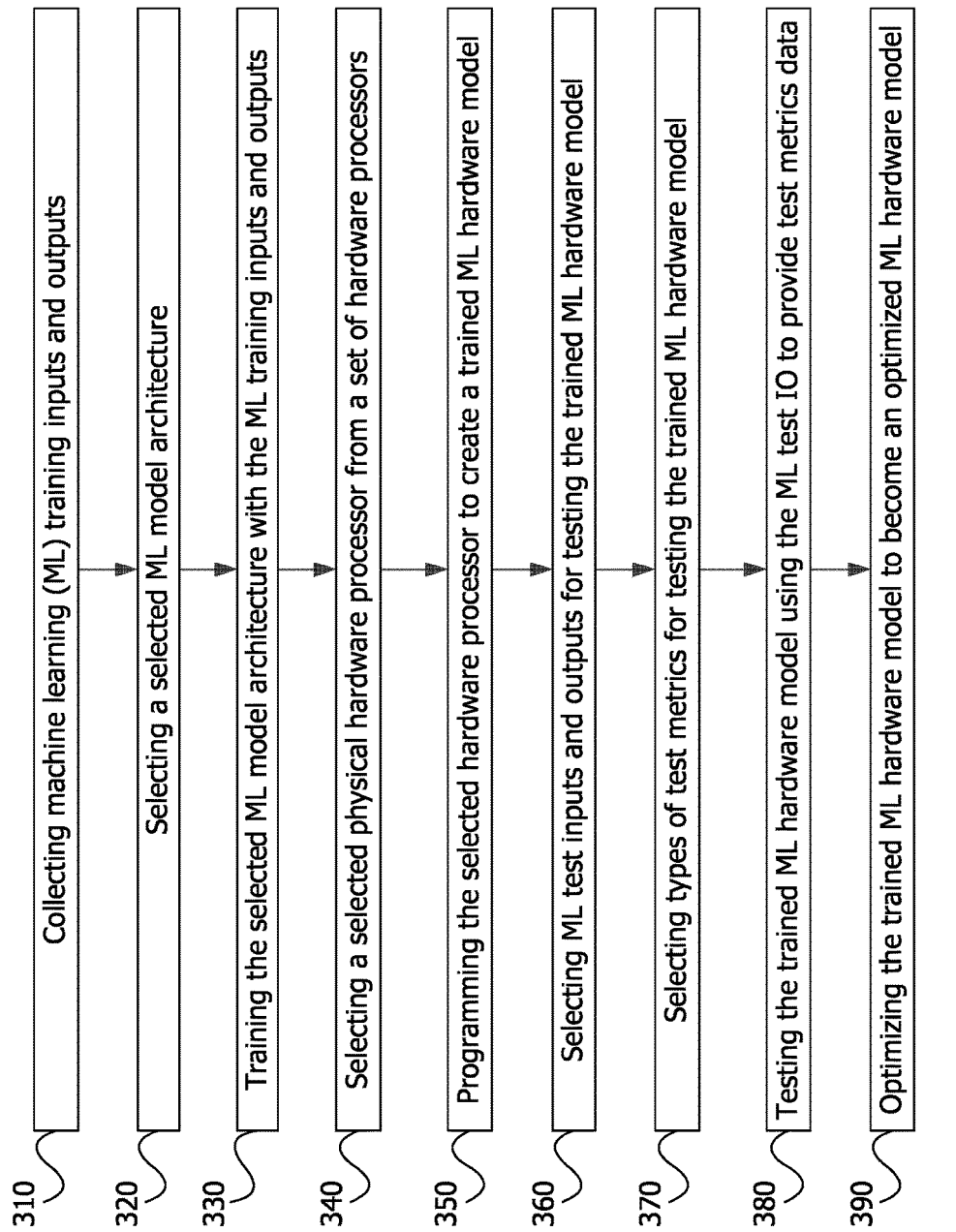
FIG. 3 shows a flow chart of an operating environment or process flow for optimizing a trained ML hardware model to become an optimized trained ML hardware model.

FIG. 3 shows a flow chart of an operating environment or process flow 300 for optimizing a trained ML hardware model 132 to become an optimized trained ML hardware model 182 using runtime test metrics data 158 from testing at 150 of a trained ML hardware model 132 of a selected hardware processor 128. Flow 300 may be performed by one or more of units of system 100 and/or 200. The flow 300 starts at step 310 and can end at step 390, but the process can also be cyclical by returning to step 310 after step 390. For example, the process may return to be performed multiple times to change model, processor, training I/O, test I/O, metric types or testing over time. In some cases, optimizing flow 300 starts with one selected processor 128 at step 340 and after testing at 380, another processor 128 is selected such as during optimizing at step 390. Process 300 may return to step 320 or 340 after step 380 or 390.

Step 310 is collecting machine learning (ML) training inputs and ML training outputs 112 for training an ML model 122. Step 310 may be performed by collector 110 or 210. The inputs may be, for example, media, image frames, video and/or audio data; and the outputs may be labels used to train architectures 118 to be models 122. Collecting at 310 may include automatically creating metadata for the ML training inputs and the ML training outputs, and labels for the ML training inputs and the ML training outputs; and storing the ML training inputs, the ML training outputs, storing the metadata, and storing the labels in a ML model database.

Step 320 is selecting a selected ML model architecture 118 or template from a set of ML model architectures 117. At least three selected ML model architectures may be selected at step 320. Step 320 may be performed by selector 115 or library 215.

Step 330 is training a trained ML model 122 by training the selected ML model architecture 118 with the ML training inputs and the ML training outputs 112 to make ML output predictions 124 based on ML inputs. Step 330 may be performed by setup 120 or training 220.

Step 340 is selecting a selected physical hardware processor 128 or chip from a set of hardware processors 126. Selecting the selected hardware processor may be selecting at least three selected hardware processors. Step 340 may be performed by selector 125, training 220, test 250 or optimizer 280.

Step 350 is programming the selected hardware processor 128 to create a trained ML hardware model 132 by inputting the selected hardware processor 128 with the trained ML model 122. Step 350 may be performed by device 130, training 220, test 250 or optimizer 280.

Step 360 is selecting or collecting ML test inputs and ML test outputs 137 for testing the trained ML hardware model 132. Step 360 may be performed by selector 135, test 250 or optimizer 280.

Step 370 is selecting types of test metrics 142 for testing the trained ML hardware model 132. The types of test metrics may be power, performance and/or accuracy performance measurements; optimization objectives; model constraints; and/or performance constraints. The types of test metrics may include Multi-objective optimization, such as for power, speed and accuracy of predictions 156 by the trained ML hardware model 132. Step 370 may be performed by selector 140 or metrics 240.

Step 380 is testing the trained ML hardware model 132 using the ML test inputs and ML test outputs (e.g., TO) 137 to provide runtime test metrics data 158 for the selected types of test metrics 142 when the data 158 are for ML output predictions 156 made by the trained ML hardware model 132 as compared to the outputs 137 for the ML test inputs 137. The runtime test metrics data 158 may predict speed, power required and accuracy for an input 137 as compared to a known or labeled output of 137. The runtime test metrics data 158 may predict metrics during all of the test inputs and outputs; or may predict the metrics during one or more predictions 156. Step 380 may include collecting and/or storing the runtime test metrics data 158 from the testing in a memory for access by an optimizer. Testing the trained ML hardware model may include testing that occurs without modeling a runtime or limits of the selected hardware processor 128.

In one example, testing at step 380 may include the trained ML hardware model 132 watching videos on a monitor and numerically measuring runtime test metrics data 158 of how well the model performs, such as benchmarking of a computer vision of object detection and tracking by the model 132 counting (e.g., of people, dogs, fruit, cars, etc.) by the trained ML hardware model 132.

Testing at 380 may also include testing the trained ML hardware model 132 in real-time during an AutoML process and using Bayesian optimization on the trained ML hardware model. Each model trained at 330 may be a data sample, which has decision variables (namely architectural and training parameters) and the outputs (model performance: accuracy, runtime and memory usage on a given processor etc.). This data sample (e.g., the variables as inputs and the outputs as outputs) may be used as training IOs 112 and/or test inputs/outputs 137.

A Bayesian algorithm of the optimizer or optimizer loop may build a statistical model using the a-priori knowledge (all tested models 132 as data samples, such as for training and/or test IOs) and then infer, from that statistical model, which values of parameters (e.g., decision variables) will result in a best performing model 122 on a given processor 128, such as to determine model 182 from models 132.

Step 380 may be performed by setup 150 or test 250.

Step 390 is optimizing the trained ML hardware model 132 to become an optimized trained ML hardware model 182 using the runtime test metrics data 158. Step 390 may include optimizing by using (e.g., based on) the runtime metrics test data 158 to select a new selected ML model architecture 118, select a new selected hardware processor 128, and/or update the trained ML model 132. Step 390 may include re-testing and re-performing optimizing the selected new selected ML model architecture, selected new selected hardware processor, and/or updated model 132 to be a new trained ML model to select a new optimized trained ML hardware model 182 using or based on the runtime test metrics data 158 of the new model 132.

The final, created ML hardware model 182 may be a faster, lower-power and/or more accurate model as compared to the trained ML hardware model 132. Step 390 may include programming processor 128 with an optimized firmware of the ML of optimized model 182. Step 390 may be performed by optimizer 180, selector 125, optimizer 280 or loop 282.

Step 380 and/or 390 may include repeatedly testing the trained ML hardware model 132 in a testing loop 282 to automatically create the optimized trained ML hardware model 182 for the ML test inputs and ML test outputs 137 and for a target selected hardware processor 128 using the runtime test metrics data 158.

Figure 4:
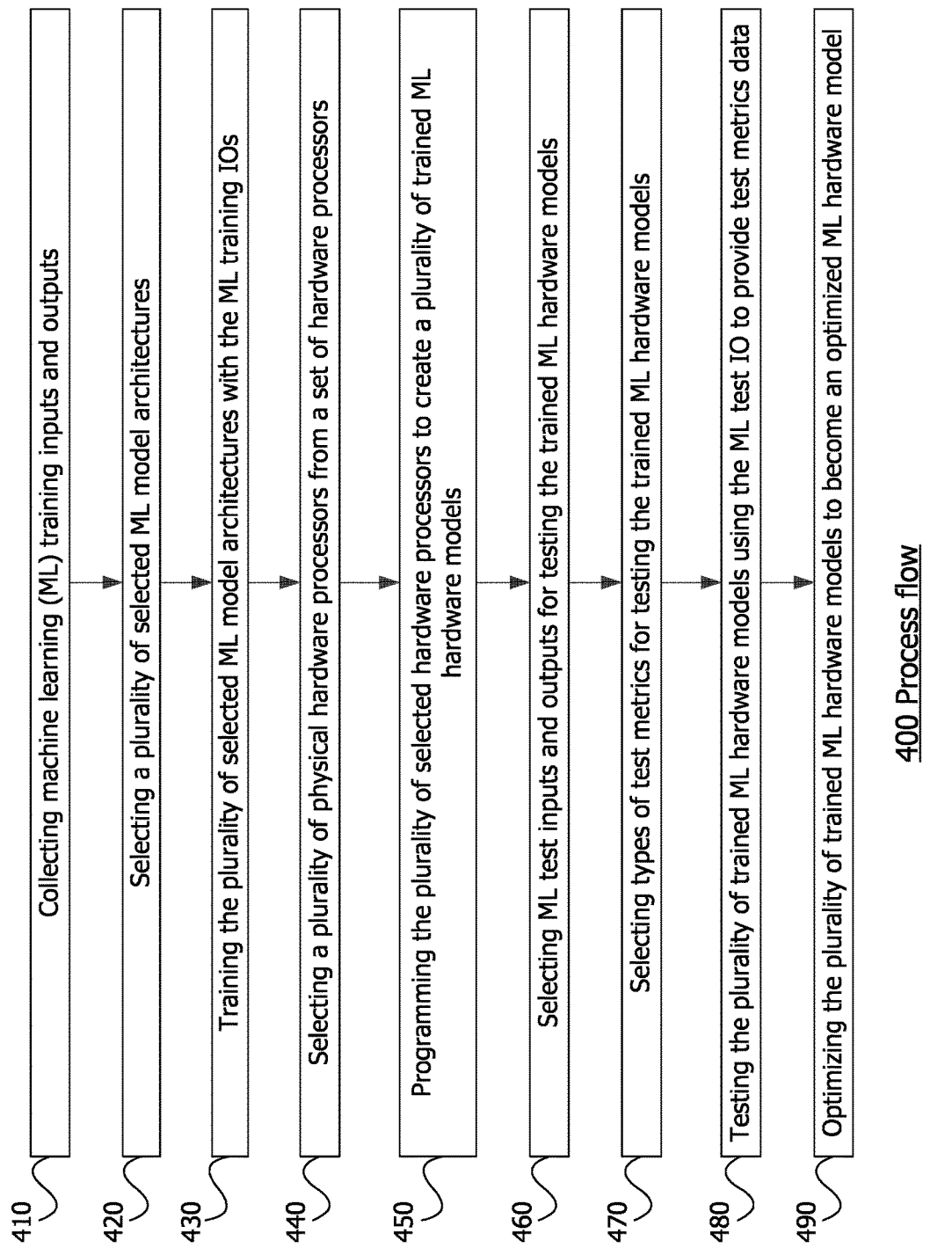
FIG. 4 shows a flow chart of an operating environment or process flow for simultaneously and automatically performing testing and comparing of runtime test metrics data of a plurality of trained ML hardware models.

FIG. 4 shows a flow chart of an operating environment or process flow 400 for simultaneously and automatically performing testing and comparing of runtime test metrics data 158 of a plurality of trained ML hardware models 132, such as to create or optimized an optimized trained ML hardware model 182. Flow 400 may be performed by one or more of units of system 100 and/or 200. Parts of flow 300 and 400 may be interchanges, such as using a step of either, for a step of the other, having the same two least significant digits. The flow 400 starts at step 410 and can end at step 490, but the process can also be cyclical by returning to step 410 after step 490. For example, the process may return to be performed multiple times to change model, processor, training I/O, test I/O, metric types or testing over time. In some cases, optimizing flow 400 starts with one selected processor 128 at step 440 and after testing at 480, another processor 128 is selected such as during optimizing at step 490. Process 400 may return to step 420 or 440 after step 480 or 490.

Step 410 is collecting machine learning (ML) training inputs and ML training outputs 112 for training a ML model 122. Step 410 may be performed by collector 110 or 210.

Step 420 is selecting a plurality of selected ML model architectures 118, types or templates from a set of ML model architectures 117. Selecting the selected ML model architectures may be selecting between three and 50 selected ML model architectures. Step 420 may be performed by selector 115 or library 215.

Step 430 is training a plurality of trained ML models 122 by training the selected ML model architectures 118 with the ML training inputs and the ML training outputs (IOs) 112 to make ML output predictions 124 based on ML inputs. Step 430 may be performed by setup 120 or training 220.

Step 440 is selecting a plurality of selected physical hardware processors 128 from a set of hardware processors 126. Selecting the selected hardware processors may be selecting between three and 100 hardware processors. Step 440 may be performed by selector 125, training 220, test 250 or optimizer 280.

Step 450 is programming the plurality of selected hardware processors 128 to create a plurality of trained ML hardware models 132 by inputting the plurality of selected hardware processors 128 with the plurality of trained ML models 122. Step 450 may be performed by device 130, training 220, test 250 or optimizer 280.

Step 460 is selecting or collecting ML test inputs and ML test outputs 137 for testing the trained ML hardware models 132. Step 460 may be performed by selector 135, test 250 or optimizer 280.

Step 470 is selecting types of test metrics 142 for testing the trained ML hardware models 132. The types of test metrics may be described in FIGS. 1-3. Step 470 may be performed by selector 140 or metrics 240.

Step 480 is testing the plurality of trained ML hardware models 132 using ML test inputs and ML test outputs (e.g., IO) 137 to produce or provide runtime test metrics data 158 for the selected types of metrics 142 when the data 158 are for or based on ML output predictions 156 made by the plurality of trained ML hardware models 132 as compared to the ML test outputs 137 when the plurality of optimized trained ML hardware models are input with the ML test inputs.

Step 480 may include descriptions of step 380 performed on a plurality of models 132, such as the number of selected architectures 118 times the number of selected processors 128. Step 480 may automatically and/or simultaneously test the plurality of models 132. Step 480 may be performed by setup 150 or test 250.

Step 490 is optimizing the plurality of trained ML hardware models 132 to become an optimized trained ML hardware model 182 using the runtime test metrics data 158 by simultaneously and automatically: performing the testing 480 of the trained ML hardware models 132 and performing comparing of the runtime test metrics data 158 of the plurality of trained ML hardware models 132. Step 490 may include optimizing by using (e.g., based on) the runtime metrics test data 158 to select a plurality of new selected ML model architectures 118, select a plurality of new selected processors 128, and/or update models 132 to be new the trained ML models 132. Step 490 may include re-testing and re-performing optimizing the selected new selected ML model architectures, selected new selected hardware processors, and/or new trained ML models to select a new optimized trained ML hardware model 182 using or based on the runtime test metrics data 158 of the new models 132.

At step 490 the optimized trained ML hardware model 182 may be a plurality of optimized trained ML hardware models 182 which may be tested (e.g., at 480) using the ML test inputs and the ML test outputs 137 to produce or provide new runtime test metrics data 158 for the selected types of metrics 142, for or based on the ML output predictions 156 made by the plurality of optimized trained ML hardware models 182 as compared to the ML test outputs 137 when the plurality of models 182 are input with the ML test inputs 137. The plurality of models 182 may be optimized using the new runtime test metrics data 158 by simultaneously and automatically performing the testing of the plurality of models 182 and performing comparing of the new runtime test metrics data 158 of the plurality of models 182. Optimizing at step 480 may include simultaneously and automatically displaying the runtime test metrics data 158 of the plurality of trained ML hardware models 132.

Step 490 may include descriptions of step 390 performed on a plurality of models 132. Step 480 may automatically and/or simultaneously optimize the plurality of models 132. Step 490 may be performed by optimizer 180, selector 125, optimizer 280 or loop 282.

Step 480 and/or 490 may include repeatedly testing the trained ML hardware models 132 in a testing loop 282 as described for FIG. 3.

Figure 5:
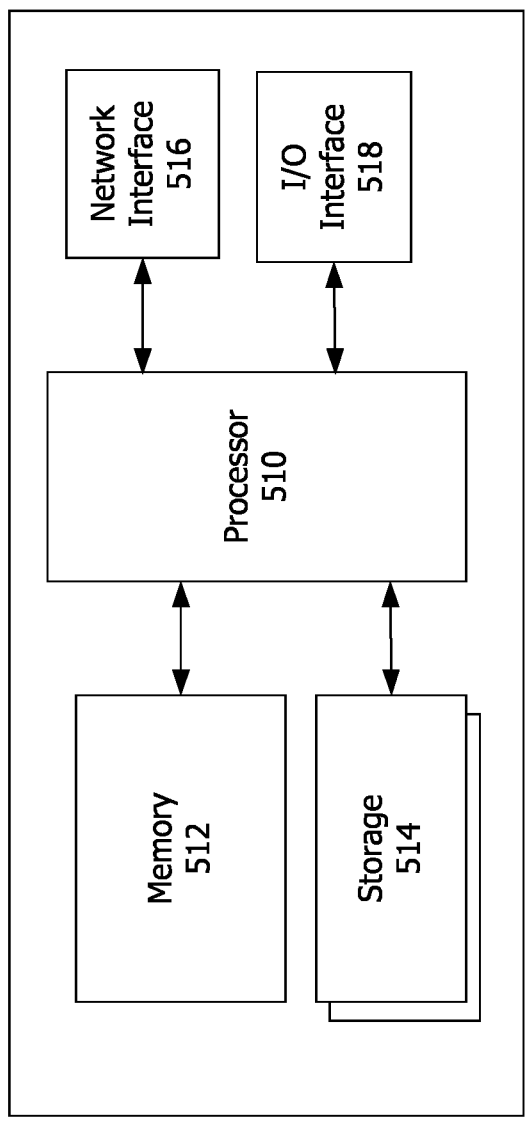
FIG. 5 is a block diagram of a computing device.

FIG. 5 is a block diagram of a computing device 500. The computing device 500 may be representative of any of the units or devices of system 100, system 200, used in process 300 and/or used in process 400. The computing device 500 may be a desktop or laptop computer, a server computer, a cloud computer or network, a client computer, a network router, a network switch, a network node, a tablet, a smartphone or other mobile device. The computing device 500 may include software and/or hardware for providing functionality and features of the units described herein, such as for optimizing trained ML hardware models 132 to become an optimized trained ML hardware model 182; and/or for simultaneously and automatically performing testing 150, 250, 350, 450 and comparing of runtime test metrics data 158 of a plurality of trained ML hardware models 132 to create an optimized trained ML hardware model 182. The computing device 500 may therefore include one or more of: logic arrays, memories, analog circuits, digital circuits, software, firmware and processors. The hardware and firmware components of the computing device 500 may include various specialized units, circuits, software and interfaces for providing the functionality and features of the units described herein.

The computing device 500 has a processor 510 coupled to a memory 512, storage 514, a network interface 516 and an I/O interface 518. The processor 510 may be or include one or more microprocessors, field programmable gate arrays (FPGAs), application specific integrated circuits (ASICs), programmable logic devices (PLDs) and programmable logic arrays (PLAs).

The memory 512 may be or include RAM, ROM, DRAM, SRAM and MRAM, and may include firmware, such as static data or fixed instructions, BIOS, system functions, configuration data, and other routines used during the operation of the computing device 500 and processor 510. The memory 512 also provides a storage area for data and instructions associated with applications and data handled by the processor 510. As used herein the term "memory" corresponds to the memory 512 and explicitly excludes transitory media such as signals or waveforms.

The storage 514 provides non-volatile, bulk or long-term storage of data or instructions in the computing device 500. The storage 514 may take the form of a magnetic or solid state disk, tape, CD, DVD, or other reasonably high capacity addressable or serial storage medium. Multiple storage devices may be provided or available to the computing device 500. Some of these storage devices may be external to the computing device 500, such as network storage or cloud-based storage. As used herein, the terms "storage" and "storage medium" correspond to the storage 514 and explicitly exclude transitory media such as signals or waveforms. In some cases, such as those involving solid state memory devices, the memory 512 and storage 514 may be a single device.

The network interface 516 includes an interface to a network such as a network that can be used to communicate network packets, network messages, telephone calls, faxes, wireless signals and/or wired power signals as described herein. The network interface 516 may be wired and/or wireless.

The I/O interface 518 interfaces the processor 510 to peripherals (not shown) such as displays, video and still cameras, microphones, user input devices (e.g., touchscreens, mice, keyboards and the like) and USB devices. In some cases, the I/O interface 518 includes the peripherals, such as displays, GUIs and user input devices, for being accessed by the user to input data, make selections and view displays as noted.

In some cases, storage 514 is a non-volatile or a non-transitory machine-readable storage medium that includes all types of computer readable media, including magnetic storage media, optical storage media, and solid state storage media. It should be understood that the software can be installed in and sold with the application 112, MCU 120 and/or fixtures 130-150. Alternatively, the software can be obtained and loaded into the application 112, MCU 120 and/or fixtures 130-150, including obtaining the software via a disc medium or from any manner of network or distribution system, including from a server owned by the software creator or from a server not owned but used by the software creator. The software can be stored on a server for distribution over the Internet.

The embodiments of systems, units and processes herein for optimizing trained ML hardware models 132 to become an optimized trained ML hardware model 182; and/or for simultaneously and automatically performing testing 150, 250, 350, 450 and comparing of runtime test metrics data 158 of a plurality of trained ML hardware models 132 to create an optimized trained ML hardware model 182 may be implemented with machine readable storage media in a storage device included with or otherwise coupled or attached to a computing device. That is, the software may be stored in electronic, machine readable media. These storage media include magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

The embodiments herein provide computing machine improvements in the systems and units; and create specific purpose computing devices as the systems and units such as by using actual processor 128 hardware in the ML models 132 testing 250 and/or optimization loop 282 to actually test on the physical board 128 to optimize models 132 to model 182 by using the real runtime/speed for predictions 156 on the real chip 128 along with the how much power the chip 128 takes and how accurate the for predictions 156 are. The embodiments herein apply to testing, optimization, comparison and pre-test as noted herein. These are improvements over training a whole suite of models without running them on actual hardware processors, which has to be super conservative because it is not known which models will really run or not, or how fast they will run on an actual physical processor. This leads to conservative training of models to make sure that when the process is done, the model will work on an actual processor. These are improvements over training a bunch of models locally on a desktop, a laptop, a remote VM, or a cluster and then running them once on a hardware processor to test if the final model works on a customer's device. This training has to be extremely conservative because it has to guess offline what will run and what will not run on actual hardware processors and on which processors.

On other hand, the embodiments herein can walk the line very tightly to maximize what is doable on the actual processor or board 128; can also test exactly what that board is good and not good at; and can gravitate to a solution to be more optimized for a particular board than not programming and testing the models on the actual processor board itself. The embodiments herein exploit the things that the board are very good at and avoid the things that it is not good at. So, if the board is really slow at one type of metric or prediction, the optimization can avoid using that board to do that, can do less of that and/or can spend more time optimizing the things that the board is good at.

The embodiments herein allow automatic exploration of ML models on new and unseen processor chips 128. This gives the ability to plug a model into an unseen, unknown chip and explore it in a black box manner. This will tell, for instance, what types of layers run the fastest on that particular chip. The exact size of the layers that the chip and supporting software can support, the numerical accuracy of running the layers on the chip, the size of the models that the chip can support. They will explore what runs best on any particular chip, because every chip may be different and the software that is included with it may be vastly different.

Each chip 128 may support a different subset of layers and different parameters for those layer types. Most chips and supporting software will support a basic convolution, but they may or may not support certain convolutions such as those with stride=2 parameters that shift over by two pixels and run the convolution again.

Some model 122 implementations that run on a chip 128 may or may not support that parameter. The embodiments herein can find out whether or not the chip supports that parameter. They can also, for instance, trade-off similar types of layers, so a convolution with stride=2 is similar to a max-pooling or an average-pooling operator as it downsizes the output from every layer. Those are not drop-in replacements for each other, but they can serve similar functions in the ML model. The embodiments herein can explore these similar layers types.

Even if one layer type is not supported, the embodiments herein can automatically try another layer, that may work in the model 132 to do the same overall functionality of what is needed in that machine learning model 132. They can explore chips 128 that are not known; explore their limits, explore what model 122 runs best on them, and what does not run on them. What is learned about the chips 128 and supporting software can then influence the later modeling steps that obtain model 182. For instance, if it is learned that interesting artifacts like (layer size mod 64) runs the fastest on this particular chip 128 because they have accelerated their vector operation sizes mod 64 of that chip, that can then be used to the next step of the AutoML optimization 180, which can optimize or designs models 182 with that layer size for that chip 128. These findings can then be used to automatically create hints for the faster exploration of models 132 and 182 afterwards, because these findings are not things that change rapidly so the findings can be stored for later use at optimizer 180 (or pre-test 270). For instance, finding that the model's convolutional operator is vastly faster than their average pooling operation. Therefore, optimizing at 180 may use the convolution operator.

The embodiments herein can store at optimizer 180 (or pre-test 270) the results at test setup 150 and/or optimizer 180 of which types of layers are supported or not supported, or the set of supported parameters for the layer. This can directly turn into hard limits for the search space, aka, do not try layer types that are not supported, or parameters that are not supported. The embodiments herein can also directly measure the max range of the parameters to help set limits for the search space. For instance, if you set, height*width*num_filters >1m, in a convolution the model might run out of memory.

The processor 128 and/or the models 122 that models 132 run on can be part of, or can extend beyond an embedded system. This same technology may apply to a GPU or TPU. An embedded system may be a computer system such as a combination of a computer processor, computer memory, and input/output peripheral devices that has a dedicated function within a larger mechanical or electronic system. It may be embedded as part of a complete device often including electrical or electronic hardware and mechanical parts. It may be embedded as part of a complete device having a camera and an output based on what is in images the camera sees. An embedded system typically controls physical operations of the machine that it is embedded within. An embedded system may be a plug-in card with processor having model 132 or 182, memory, power supply, and external interfaces.

The embodiments herein may have some kind of software installed on the chips 132 so that they can interact with the systems or test setup to write an interface for the chips to the system, test setup or test. This can be custom software or existing software, e.g. from the chip manufacturer that allows the system to be able to convert a model and tell it to run on device 128. There may be a basic interface that sits on processor 128 device being tested.

The embodiments herein can measure (e.g., metrics 142) how fast a model 132 runs to obtain a prediction 156, how much power it uses (e.g., per prediction, per-layer, per-chip/core), what the final prediction accuracy versus the known output was from it, how accurately/correctly did every layer of the model or processor run, and how fast did every layer run, how much memory was used for each layer? This may be instrumented on a display when the model 122 are run on the chips 128. The model 132 can also be sized down to a single layer to better test that layer type/parameters/inputs in isolation. This can locate issues like the numerical accuracy diminishes as the inputs grow/shrink or are closer to min/max value of the inputs.

The communication interface between the system, test setup or test and the target chip 128 may depend on the chip. It could be over purely wireless, e.g. Bluetooth or WiFi, or it could be wired through, e.g., serial. The interface may also have the ability to talk Bluetooth to the chip. It may be an evaluation kit for chips, which is using, has a USB interface.

The embodiments herein may send a model 122 to be run on the chip 128. They may compile the model 122 to run specifically for that chip 128 (using one or more model conversion software packages) and send the code of the model to the chip; and then they can get back to results or data 158 of the testing or running of the model on the chip. There may be a test harness that measures power while doing this. That lets the optimizer walk the multi-variable or multi-type of metrics frontier of speed, accuracy, power, and cost (or a user specified metric) to create or choose optimized model 182. There may also be black box testing which tests how good the model runner, test setup 150 or test 250. The execution of the model 122 on device 128 for tests of different models 132 may implement layer operators slightly differently. Layer operators may use 5 different versions, 5 different iterations of the convolution operator. They may be different revisions of an operator.

Even though the model 122 is converted and run as model 132, it may not run exactly perfectly and that can be measured by the embodiments herein. They can measure what types of layers run most correctly; and the inputs and parameters which allow the model 132 to run most correctly. For example, they may learn that the average pooling layer runs almost perfectly versus the convolution because during testing the model has a lot more math involved leading to a little more numerical deviation in the prediction from the expected or know output.

There are a lot of ways for the optimizer to approach testing and optimization. One exploration strategy is to first test individual types of layers of the model or chip to see just a quick level of support vs. non-support for that layer type.

Another strategy is to do a run-through of a trivial model 122 or 132 that has an input layer and output layer (optional) and a type of layer that it is desired to test, just to see whether that layer exists and if the model fails at the compile step because the compiler and/or supporting software does not know that layer or that layer may fail on the device 128. It is also possible to start getting numerical accuracy and speed from the run through on the chip at that point and then start running more complex models 122 to explore combinations of layers that run well on device 128.

Optimizing may include getting metrics or information on which chip 128 runs fastest for a particular use case for model 122. A model 122 can be plugged into random chips 128 to see which ones work best for that use case, such as a camera tracking the number of people that walk in and out of a room. Optimizing may include the automatic exploration of chips 128 partially for this purpose, and partially because customers of machine learning in general want to know what embedded chip they should use. Alternatively, they may want to know for a particular chip 128 what is the best that a model 122 can do running on this particular chip.

Optimizing may include a customer wanting to know when they have five available chips 128, which one has the highest prediction 156 accuracy with a model 122? Which one has the lowest power utilization? What model 132 can run the fastest predictions or what chip 128 can run the fastest predictions? Which is the cheapest chip that meets the customer's criteria? And those may be different answers per question. The fastest chip probably isn't the most power efficient chip. The fastest is going to be running, say on a GPU, but the power utilization is hundreds of watts, versus milliwatts, or microwatts for an embedded chip.

An important part of optimizing may include testing of capability to perform particular convolutions. How quick does it do it and how much power does it consume to do that?

Critical components of model 182, data 158 or metric types 142 may include capability, speed, power, and final accuracy that can be produced by models 132. The optimized model 182 may have a highest average of capability, accuracy, speed and power of models 132.

For a customer the optimizer can also take in their particular use case and their particular training data 112 to see what runs best, what processor 128 runs their workload of the model 122 trained with their data 112 best. Different data 112 tasks may also require different types of kernels and different types of accelerations. If data 112 is for an audio recognition task or a vision task or particular type of vision task, different chips 128 may perform quite differently on these depending on what kind of operations the chips support natively.

The optimizer may also consider constraints 219. For example, some chips 128 may be too small to run a given model where other chips may be right, so the optimizer may also deal with this kind of constraint. The optimizer may determine that certain chips 128 cannot run a model 122 given constraints 219, especially if the constraints 219 have hard limits like they need to run at least a threshold number of frames per second of input training or test data. This would be a hard failure on a particular chip.

The embodiments herein may optimize models 132 for image processing or any kind of processing of an embedded processor 128 (or a larger processor). The chip 128 could handle sensor fusion for detection of someone standing up, for instance, as an ML model 132. Kind of like a pose detection model style, except the embedded system is only using an accelerometer and a gyroscope of a cell phone or a small, embedded device. The embodiments herein can make ML models for that.

The embodiments herein may help see what a chip 128 is capable of doing so that a user of the optimizer can turn the dials to improve performance of models 132 or of an optimized model 182. For instance, spending additional development time at the optimizer to improve the execution of a convolutional layer since data 158 found that that operation was taking a large amount of the total runtime, and has some numerical inaccuracy. This focuses engineering efforts on the most valuable work items.

This is useful for direct customers, so if they come up with a novel use case, they can send data to collector 110 or data can be collected for them to automatically optimize to find the best model 182 for their particular custom model or device.

The embodiments herein may provide data science as a service, such as using data 158 or from pre-test 270. If a customer wants a particular model made, the embodiment can provide an auto ML platform or system for doing it.

Other auto ML platforms may be designed to model mostly for GPUs or CPUs, sometimes for rather large, embedded devices. But they do not model very well because they are extremely conservative in the models that they produce because they don't know in real time what will run and not run on a particular chip. Thus, they have to build something that's conservatively small.

The embodiments herein, on the other hand, can automatically explore the chip 128 and find out exactly what types of things run very well on that particular chip and make something that's extremely well fit to run and maximize the chip or interface software, maximize the model 122 that can run on that chip. The embodiments herein provide model 182 that is far closer to what is most optimal for that particular chip 128, versus not testing the models 122 on the chip 128 itself. Other AutoML platforms may strictly do offline, non-processor embodiment creation of the models, and then at the very end of the process, tests directly on the chip once.

Training and/or testing (e.g., validation, deployment or customer model) may use a physical device having an embedded chip 128 with a particular digital signal processing (DSP) between the camera and chip so that it is platform based. The DSP that sits in front of the main chip that can do things like resizing and color correction and whatnot. If the physical device does not have that particular chip the DSP has to get offloaded to the main processor that is possibly slower at that particular piece, is less efficient at doing that, and/or cannot get some of the inherent parallelism of having multiple chips running, each doing their independent tasks.

The embodiments herein may provide not just chip 128 exploration, but also the platform or board level exploration, such as at the optimizer, validator, deployment or custom model. The term "chip" may mean the chip 128 and the surrounding physical device chips, because a singular chip doesn't work in isolation in most cases.

In some cases, optimizing includes not just a user choosing what chip 128 models 122 run best on. The cost of the chip also matters. Effectively, the optimizer can consider knowing there is a certain level of performance/data 158 that is sufficient for model 182, and then optimizing cost beyond that point. For example, optimize to the model 182 that has the lowest price chip that can hit 95% accuracy of five frames per second. Optimizer can automatically quit when it hits that criteria because it is good enough. It can also keep making models 182 to drive down the power envelope of running the model.

Optimizing may end the analysis once it plateaus with a primary dimension or data 158 of power, speed and accuracy. If optimizing is no longer making progress, it can end it, or end if it hits the criteria that the user is looking for of say 95% accuracy at four at 5 frames per second. Maybe the user does not care about power, because that is another end condition for when to finish. Or it might want to find any chip that uses less power than some target.

Optimizing may drop in a replacement for layers. Instead of doing an average pooling optimizing can do a convolution with stride 2. It is generally a bit slower, but it is otherwise sufficing for a very similar purpose. It will in the end do a reduction of the size of the layer.

Optimizing may use or know about various types of activation functions, most of which can replace others. The chip 128 and supporting software is only going to implement, say, two of them on the exact physical device for the software that accompanies the device or if the device executes models directly.

For example, some physical device hardware only implements a few types of activation functions where there are at least a dozen types of activation functions that can be used, plus the parameters for them that may or may not be supported. A certain non-linear activation function model that performs a threshold operation with clipping may or may not be supported on a particular physical device. Optimizing can drop in other types of activation functions that can automatically explore what is the closest model 122 that can run the desired model 182.

Optimizing may include testing models 132 to failure and then we move back the boundary of models 122 and processor 128 a bit to the level that will run during testing. Optimizing may design the model and then we run the model on processor 128. The model will either run or it will not run and if it does run it tells optimizer how fast, how fast was every different layer, how much memory was utilized by every different portion of the model, how good was the accuracy, how good was the power utilization? Optimizer may consider not just if the model 132 runs at all, but also how long it took for each segment of the model to execute.

Optimizing may use the results of the blackbox testing at setup 150 to accelerate the AutoML runs of loop 282. For instance, optimizing may reduce the search space to what is doable on the chip 128. There may be no reason to re-explore the maximum number of filters in a convolutional layer, because optimizer already knows this maxim. Further, optimizing or pre-test may integrate the learnings from the initial exploration and future learn from AutoML run on the chip (and combine learnings from multiple chips), to accelerate future AutoML optimizer runs and get to better optimization more quickly.

The embodiments herein may produce a custom firmware for the chip 128 which monitors the model 182 execution so that the chip of model 182 monitors itself. This bit of code that runs on the target chip and is so small and light that it doesn't materially impact the chip's performance behavior or has correction factor to negate the monitoring code. The custom firmware may help embodiments get more detailed information. The firmware is not needed to get things like how fast was the model's execution time, how much power did the model, what was the accuracy of the model. Power consumption which may be done with an external power measurement circuit.

Optimization may include multi-objective optimization where the optimizer automatically explores the boundary condition of what is the best model 122 that can run on that particular processor 128. This can get closer to the optimal boundary than not testing on hardware processor 128 because that needs to be conservative to be sure to run. Here, optimizing can test every/many models 122 to know that one will run on the board 128 which gives a have guarantees of model 182 it running after the optimizer completes model 182.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" or "number" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As It is claimed:

1. A method for optimizing a trained ML hardware model to become an optimized trained ML hardware model using runtime test metrics data from testing of the trained ML hardware model of a selected hardware processor, the method comprising:
   collecting machine learning (ML) training inputs and ML training outputs for training a ML model;
   selecting a selected ML model architecture from a plurality of ML model architectures;
   training a trained ML model by training the selected ML model architecture with the ML training inputs and the ML training outputs to make ML output predictions based on ML inputs;
   selecting a selected hardware processor from a plurality of hardware processors;
   programming the selected hardware processor to create a trained ML hardware model by inputting the selected hardware processor with the trained ML model;
   selecting ML test inputs and ML test outputs for testing the trained ML hardware model;
   selecting types of test metrics for testing the trained ML hardware model;
   testing the trained ML hardware model using the ML test inputs and ML test outputs to provide runtime test metrics data for the selected types of test metrics, wherein the runtime test metrics data are for ML output predictions made by the trained ML hardware model input with the ML test inputs, as compared to the outputs; and
   optimizing the trained ML hardware model to become an optimized trained ML hardware model using the runtime test metrics data by one of:
      selecting a new selected ML model architecture,
      selecting a new selected hardware processor, or
      updating the trained ML model using the runtime metrics test data.

2. The method of claim 1,
   wherein selecting the selected ML model architecture comprises selecting at least three selected ML model architectures; and
   wherein selecting the selected hardware processor is selecting at least three selected hardware processors.

3. The method of claim 1, wherein the types of test metrics include multi-objective optimization of power, speed and accuracy of predictions during testing of the trained ML hardware model.

4. The method of claim 1,
   wherein testing the trained ML hardware model includes:
      testing without modeling a runtime or limits of the selected hardware processor; and
      testing the trained ML hardware model in real-time; and
   wherein the final created ML hardware model is a more accurate, faster and lower-power prediction model as compared to the trained ML hardware model.

5. The method of claim 1, wherein testing includes the trained ML hardware model watching videos on a monitor and numerically measuring the runtime test metrics data of a computer vision of object detection of the trained ML hardware model.

6. The method of claim 1, wherein testing includes repeatedly testing the trained ML hardware model in a testing loop to automatically create the optimized trained ML hardware model for the ML test inputs and ML test outputs and for a target selected hardware processor using the runtime test metrics data.

7. The method of claim 1, wherein optimizing includes re testing and re performing optimizing for the one of:
   selected new selected ML model architecture,
   selected new selected hardware processor, or
   updated trained ML model using the runtime test metrics data.

8. The method of claim 1, wherein updating the trained ML model includes one of further training or retraining from scratch the trained ML model using the runtime test metrics data.

9. The method of claim 1, further comprising one of:
   a) validating the optimized trained ML hardware model to become a validated ML hardware model by testing the optimized trained ML hardware model with automated simulator inputs and outputs to produce validation test data; and training the optimized trained ML hardware model with the automated simulator inputs and outputs; and/or
   b) deploying the optimized trained ML hardware model to become a deployed ML hardware model by testing the validated ML hardware model with customer simulator inputs and outputs to produced deployment test data; and training the optimized trained ML hardware model with the customer simulator inputs and outputs.

10. The method of claim 1, further comprising one of:
    a pre-testing to determine which types of operations of the trained ML hardware model are supported by the selected hardware processor and how efficient the selected hardware processor is in executing those operations;
    using a bayesian algorithm of the optimizer to build a statistical model using an a-priori knowledge of the data of tested trained ML hardware model as new test inputs and outputs used to test the statistical model to determine which values of parameters or decision variables of the statistical model will result in a best performing trained ML model on a selected hardware processor to determine the optimized trained ML hardware model from trained ML hardware model; or
    creating a final created ML hardware model by writing firmware to the selected or new selected hardware processor to create a hardware version of the optimized the trained ML hardware model.

11. A method for simultaneously and automatically performing testing and comparing of runtime test metrics data of a plurality of trained ML hardware models, the method comprising:
    collecting machine learning (ML) training inputs and ML training outputs for training a ML model;
    selecting a plurality of selected ML model architectures from a set of ML model architectures;
    training a plurality of trained ML models by training the selected ML model architectures with the ML training inputs and the ML training outputs to make ML output predictions based on ML inputs;
    selecting a plurality of selected hardware processors from a set of hardware processors;
    programming the plurality of selected hardware processors to create a plurality of trained ML hardware models by inputting the plurality of selected hardware processors with the plurality of trained ML models;
    selecting types of metrics for testing the plurality of trained ML hardware models;

testing the plurality of trained ML hardware models using ML test inputs and ML test outputs to produce runtime test metrics data for the selected types of metrics, wherein the runtime test metrics data are based on ML output predictions made by the plurality of trained ML hardware models as compared to the ML test outputs when the plurality of trained ML hardware models are input with the ML test inputs; and optimizing the plurality of trained ML hardware models to become an optimized trained ML hardware model using the runtime test metrics data by simultaneously and automatically performing the testing the trained ML hardware models and performing comparing of the runtime test metrics data of the plurality of trained ML hardware models.

12. The method of claim 11, wherein optimizing includes:
simultaneously and automatically displaying the runtime test metrics data of the plurality of trained ML hardware models.

13. The method of claim 11,
wherein optimizing includes one of:
selecting a new selected ML model architecture,
selecting a new selected hardware processor, or
updating the trained ML model using the runtime metrics test data; then
re-testing and re-optimizing the optimized trained ML hardware model to select a new optimized trained ML hardware model.

14. The method of claim 11, wherein the optimized trained ML hardware model is a plurality of optimized trained ML hardware models; and further comprising:
testing the plurality of optimized trained ML hardware models using the ML test inputs and the ML test outputs to produce new runtime test metrics data for the selected types of metrics, wherein the new runtime test metrics data are based on the ML output predictions made by the plurality of optimized trained ML hardware models as compared to the ML test outputs when the plurality of optimized trained ML hardware models are input with the ML test inputs; and
optimizing the plurality of optimized trained ML hardware models using the new runtime test metrics data by simultaneously and automatically performing the testing of the plurality of optimized trained ML hardware models and performing comparing of the new runtime test metrics data of the plurality of optimized trained ML hardware models.

15. The method of claim 11, wherein the types of test metrics include multi-objective optimization of power, speed and accuracy of predictions during testing of the trained ML hardware models.

16. The method of claim 11, further comprising one of:
a pre-testing to determine which types of operations of the trained ML hardware model are supported by the selected hardware processor and how efficient the selected hardware processor is in executing those operations;
using a bayesian algorithm of the optimizer to build a statistical model using an a-priori knowledge of the data of tested trained ML hardware models as new test inputs and outputs used to test the statistical model to determine which values of parameters or decision variables of the statistical model will result in a best performing trained ML model on a selected hardware processor to determine the optimized trained ML hardware model from trained ML hardware models; or creating the optimized ML hardware model by writing firmware to one of the selected hardware processors to create a validated version of the optimized ML hardware model.

17. A system for optimizing trained ML hardware models to become an optimized trained ML hardware model using runtime test metrics data from testing of the trained ML hardware models of selected hardware processors, the system comprising:
a collector for collecting machine learning (ML) training inputs and ML training outputs for training a ML model;
an ML model architecture selector for selecting a plurality of selected ML model architectures from a set of ML model architectures;
a training setup for training a plurality of trained ML models by training the selected ML model architectures with the ML training inputs and the ML training outputs to make ML output predictions based on ML inputs;
a hardware processor selector for selecting a plurality of selected hardware processors from a set of hardware processors;
a program computing device for programming the plurality of selected hardware processors to create a plurality of trained ML hardware models by inputting the plurality of selected hardware processors with the plurality of trained ML models;
a type of test metrics selector for selecting types of test metrics for testing the trained ML hardware models;
a testing setup for testing the plurality of trained ML hardware models using the ML test inputs and ML test outputs to produce runtime test metrics data for the selected types of test metrics, wherein the runtime test metrics data are based on ML output predictions made by the plurality of trained ML hardware models given the ML test inputs; and
an optimizer for optimizing the plurality of trained ML hardware models to become an optimized trained ML hardware model using the runtime test metrics data by simultaneously and automatically performing the testing the trained ML hardware models and performing comparing of the runtime test metrics data of the plurality of trained ML hardware models.

18. The system of claim 17, wherein the optimizer includes:
a display for simultaneously and automatically displaying the runtime test metrics data of the plurality of trained ML hardware models.

19. The system of claim 17, wherein the optimizer includes one of:
a new model selector for selecting a new selected ML model architecture that is part of the optimized trained ML hardware model,
a new processor selector for selecting a new selected hardware processor that is part of the optimized trained ML hardware model, or
a model updater for updating the trained ML model using the runtime metrics test data to be the optimized trained ML hardware model; and
a re-tester and re-optimizer for re-testing and re-optimizing the optimized trained ML hardware model to select a new optimized trained ML hardware model.

20. The system of claim 17, wherein the optimized trained ML hardware model is a plurality of optimized trained ML hardware models; and further comprising:
the testing setup for testing the plurality of optimized trained ML hardware models using the ML test inputs and the ML test outputs to produce new runtime test metrics data for the selected types of metrics, wherein the new runtime test metrics data are based on the ML output predictions made by the plurality of optimized trained ML hardware models given the ML test inputs; and the optimizer for optimizing the plurality of optimized trained ML hardware models using the new runtime test metrics data by simultaneously and automatically performing the testing of the plurality of optimized trained ML hardware models and performing comparing of the new runtime test metrics data of the plurality of optimized trained ML hardware models.

21. The system of claim 17, wherein the types of test metrics include multi-objective optimization of power, speed and accuracy of predictions during testing of the trained ML hardware model.

22. The system of claim 17, further comprising one of:

a pre-test to determine which types of operations of the trained ML hardware model are supported by the selected hardware processor and how efficient the selected hardware processor is in executing those operations;

a bayesian algorithm of the optimizer to build a statistical model using an a-priori knowledge of the data of tested trained ML hardware models as new test inputs and outputs used to test the statistical model to determine which values of parameters or decision variables of the statistical model will result in a best performing trained ML model on a selected hardware processor to determine the optimized trained ML hardware model from trained ML hardware models; or a validator for creating a validated version of the optimized ML hardware model by writing firmware to one of the selected hardware processors.

* * * * *